United States Patent [19]

Aso

[11] 3,774,917

[45] Nov. 27, 1973

[54] APPARATUS FOR MANUALLY OPERATING A PICK-UP ARM IN AN AUTOMATIC RECORD PLAYER

[75] Inventor: Mikio Aso, Kokohama, Japan

[73] Assignee: Victor Company of Japan, Ltd., Kanagawa-ken, Japan

[22] Filed: June 16, 1971

[21] Appl. No.: 153,647

[30] Foreign Application Priority Data

June 16, 1970 Japan .......................... 45/60174
Dec. 2, 1970 Japan .......................... 45/120501

[52] U.S. Cl. .......................... 274/23 R
[51] Int. Cl. .......................... G11b 3/10
[58] Field of Search .......................... 274/23, 14, 15

[56] References Cited

UNITED STATES PATENTS 3,534,967 10/1970 Freier .......................... 274/10 R
3,414,271 12/1968 Eisemann .......................... 274/23 R

*Primary Examiner*—Harry N. Haroian
*Attorney*—Holman & Stern

[57] ABSTRACT

An apparatus for manually operating a pick-up arm in an automatic record player comprises means for automatically elevating a pick-up arm upon completion of playing of a record and means for elevating the pick-up arm by a manual operation when the automatic elevating means is not in operation and the pick-up arm is at its lowered position. The manually operated elevating means elevates and lowers, through an end portion of a lever of the automatic elevating means, or directly, a rod provided for moving the pick-up arm upwardly and downwardly.

4 Claims, 7 Drawing Figures

APPARATUS FOR MANUALLY OPERATING A PICK-UP ARM IN AN AUTOMATIC RECORD PLAYER

BACKGROUND OF THE INVENTION

This invention relates to an apparatus for manually operating a pick-up arm in an automatic record player, and more particularly to an apparatus provided, in an automatic record player such as an auto-return type record player or a full automatic type record player, for moving a pick-up upwardly and downwardly by a manual operation at its halfway position on a record disc.

There has been generally employed an automatic record player in which a pick-up stylus is automatically placed softly on the surface of the record disc at a lead-in position and the pick-up stylus is automatically lifted from the surface of the record disc at a lead-out position. In this automatic record player, it is sometimes necessary to lift the pick-up arm to stop playing of the record disc halfway or lower the pick-up arm to start playing of the record disc from a halfway position.

PRIOR ART

Various devices have been proposed for manually effecting upward and downward movements of the pick-up arm to stop or start playing of the record at a halfway position on the record disc. In the conventional devices, however, a mechanism for moving the pick-up arm upwardly and downwardly to make cueing by a manual operation is provided separately from a mechanism for automatically moving the pick-up arm upwardly and downwardly by utilizing a rotation of the pick-up arm and a rotational force of a turntable. Accordingly, these conventional devices have complicated constructions and require many component parts which result in a high manufacturing cost.

OBJECTS AND SUMMARY OF THE INVENTION

It is, therefore, a general object of the invention to provide a novel and useful apparatus having a relatively simple construction for manually operating a pick-up arm in an automatic record player.

Another object of the invention is to provide a manually operated apparatus for lifting a pick-up at its halfway playing position on the record disc or lowering the pick-up to make a soft contact with the record disc at a halfway position on the record disc. The mechanism which moves the pick-up arm upwardly and downwardly by a manual operation and the mechanism which is automatically actuated upon completion of playing of a record disc to move the pick-up arm upwardly and downwardly are associated with each other with respect to a rod for lifting and lowering the pick-up arm. By this arrangement, the apparatus has a simplified construction with less component parts than are used in the conventional apparatus.

A further object of the invention is to provide a manually operable apparatus in which the mechanism for manually moving the pick-up arm upwardly and downwardly does not have an adverse effect on the mechanism for automatically moving the pick-up arm upwardly and downwardly, whereby each of the two mechanisms is capable of performing its function accurately and smoothly.

A still further object of the invention is to provide a manually operable apparatus in which damper means is provided for enabling the pick-up stylus to fall softly on the record disc when the pick-up arm is lowered by a manual operation.

Other objects and features of the invention will become apparent from the description made hereinbelow with reference to the accompanying drawings, in which:

DETAILED DESCRIPTION OF THE INVENTION

Figure 1:
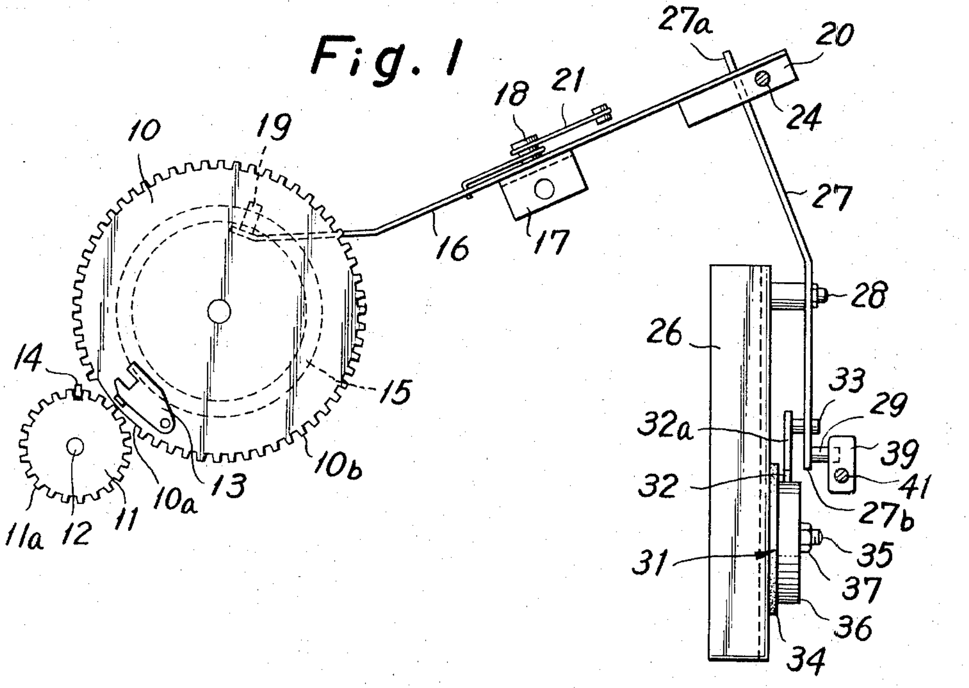
FIG. 1 is a plan view of one embodiment of a manually operable apparatus according to the invention.
Figure 2:
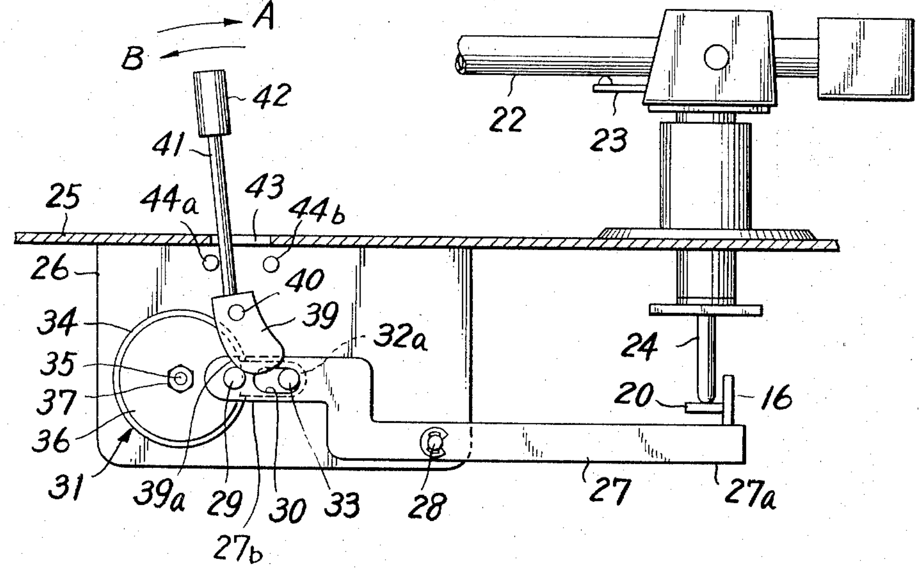
FIG. 2 is a side elevation view of the essential part of the apparatus shown in FIG. 1.
Figure 3:
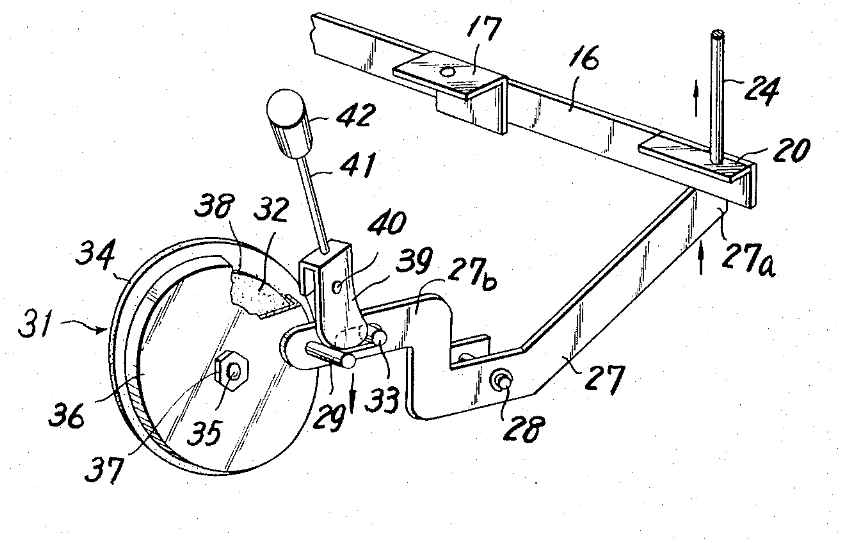
FIG. 3 is a perspective view of the part shown in FIG. 2.

First, one embodiment of the manually operable apparatus according to the invention will be described with reference to FIGS. 1 to 5. In FIGS. 1 to 3, a control gear 10 has teeth **10*b* along the periphery thereof, and also has a toothless portion 10*a*. A turntable gear 11 is rotated integrally with a turntable about a shaft 12. While a record is being played or a pick-up is at a rest position, the control gear 10 is at a standstill with its toothless portion 10*a* facing the turntable gear 11. An engaging member 13 which is pivotally mounted on the upper surface of the control gear 10 is rotated by a trip mechanism (not shown) of a well-known type which is actuated when the pick-up is moved to a lead-out position of the record disc upon finishing of its playing of a record disc. The engaging member 13, when it is rotated by the trip mechanism, is brought into engagement with a projection 14 provided on the rotating turntable gear 11. The engaging member 13 is pushed by the projection 14, whereby the control gear 10 is rotated. When the control gear 10 is slightly rotated, the teeth 10b of the control gear 10 mesh with teeth 11*a* of the rotating turntable gear 11. This causes the control gear 10 to be rotated by the rotating turntable gear 11**.

A cam disc 15 is fixedly mounted on the lower surface of the control gear 10. The cam disc 15 has a cam surface of an inverted V shape. A first swinging lever 16 which makes a see-sawing movement upwardly and downwardly is pivotally mounted on a bracket 17 by means of a shaft 18. At one end of the lever 16, there is provided an abutting portion 19 which is in abutting engagement with the cam surface of the cam disc 15. At the other end of the lever 16, there is provided a support 20. The lever 16 is urged by a spring 21 which is wound on the shaft 18 with one end being fixed at the chassis and the other end being in engagement with the lower surface of the lever 16 in a direction in which the abutting portion 19 is constantly pushed to the cam surface of the cam disc 15. A pick-up arm 22 carrying a pick-up (not shown) at its foremost end is lowered and elevated, namely moved upwardly and downwardly, by an elevator 23. A rod 24 of the elevator 23 is placed on the support 20.

A bracket 26 is fixed to the lower surface of a plate 25. A second swinging lever 27 which makes a see-sawing movement upwardly and downwardly is pivotally mounted to the bracket 26 by means of a shaft 28. One end portion 27*a* of the lever 27 supports the end portion of the lever 16 at which the support 20 is provided. The lever 27 has a bent end portion 27*b* at the other end thereof. A stud 29 is fixed at the end of the end portion 27*b*. The end portion 27*b* is also formed with a slot 30. A stud 33 which is engaged in the slot 30 is fixedly mounted on a projection 32*a* of a rotating disc 32 which is a component part of a damper 31.

Figure 4:
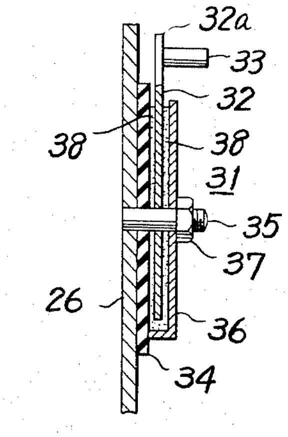
FIG. 4 is a cross-sectional plan view of a damper.
Figure 5:
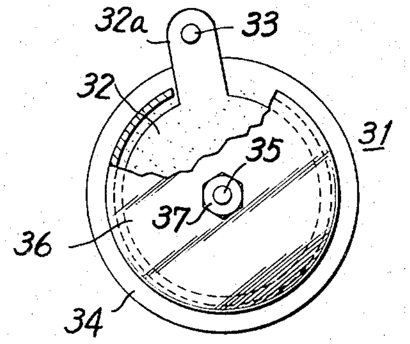
FIG. 5 is a side elevation view of the damper with its cover partly cut away.

The details of the damper 31 are illustrated in FIGS. 4 and 5. A rubber sheet (or a steel plate) 34 is attached to the bracket 26 and a shaft 35 is inserted through the center thereof. A cover 36 is provided over the rubber sheet 34 and is fastened by means of a nut 37 which is threaded on the threaded end portion of the shaft 35. The disc 32 is pivotally supported on the shaft 35. Silicon grease 38 is filled in the space on both sides of the disc 32 and inside of the cover 36.

A cueing cam 39 is pivotally supported on a shaft 40 provided on the bracket 26. At the upper portion of the cam 39, there is fixed a lever 41 which extends through an aperture 43 formed in the plate 25 and has a cueing handle 42 at its end above the plate 25. The range of rotation of the handle 42 is restricted by stops 44*a* and 44*b* provided on the bracket 26.

An operation of the apparatus having the above described construction will be described. During playing of a record, the control gear 10 is at a standstill with its toothless portion 10*a* facing the turntable gear 11. In this state, the abutting portion 19 of the lever 16 is at its elevated position in abutting engagement with the inverted V-shaped cam surface of the cam disc 15. Accordingly, the support 20 is at its lowered position and the rod 24, the elevator 23 and the pick-up arm 22 are also at their lowered positions. Consequently, the pick-up stylus is placed on the surface of the record disc.

If it is desired during playing of the record disc to lift the pick-up and stop the playing, the handle 42 is moved in a pivotal motion in a direction of arrow A (clockwise direction) in FIG. 2. The pivotal movement of the handle 42 causes the cam 39 to rotate in a clockwise direction about the shaft 40. In as much as a curved cam surface 39*a* of the cam 39 is in abutting contact with the stud 29, the stud 29 receives a downwardly urging force by the pivotal movement of the cam 39. This causes the stud 29 and the lever 27 to rotate about the shaft 28 in a counterclockwise direction.

By the counterclockwise rotation of the lever 27, the end portion 27a moves upwardly, causing the lever 16 to rotate and the support 20 to move upwardly. As the support 20 moves upwardly, the rod 24 and the elevator 23 move upwardly. The upward movement of the elevator 23 elevates the pick-up arm 22, thereby lifting the pick-up stylus from the surface of the record disc.

By the counterclockwise rotation of the lever 27, the end portion 27*b* of the lever 27 moves the stud 33 which is in engagement with the slot 30 downwardly. The rotating disc 32 rotates with the stud 33 in a clockwise direction.

If it is desired to lower the pick-up for resuming playing of the record disc, the handle 42 is moved in a pivotal motion in a direction of arrow B (counterclockwise direction). As the cam 39 rotates in a counterclockwise direction with the handle 42, the pin 29 is released from engagement with the cam surface 39*a* of the cam 39. As a result, the lever 27 is released from engagement with the cam 39 and becomes freely swingable. The lever 16 is constantly urged by force of the spring 21 in a direction in which the lever 16 rotates so as to lower the support 20, whereas the support 20 constantly receives a force exerted downwardly due to weights of the pick-up arm 22, the elevator 23, the rod 24 etc. Accordingly, when the lever 27 is released from engagement with the cam 39, the support 20 moves downwardly, rotating the levers 16 and 27. As a result, the rod 24, the elevator 23 and the pick-up arm 22 also move downwardly, bringing the pick-up stylus into contact with the surface of the record disc. Thus, the playing of the record disc is resumed.

By the clockwise rotation of the lever 27, the stud 33 which is in engagement with the slot 30 is moved upwardly. The rotating disc 32 is rotated counterclockwise with the stud 33. Since the silicon grease 38 is filled in the space on both sides of the rotating disc 32 and inside of the cover 36 of the damper 31, the rotation of the rotating disc 32 is slowly made due to viscosity resistance of the silicon grease 38. Accordingly, even if the cueing handle 42 is rapidly moved, the lever 27 is moved in a slow pivotal motion by the stud 33 of the slowly turning rotating disc 32. This causes the support 20 to move slowly downwardly with a resultant slow downward movement of the pick-up arm 22. Consequently, the pick-up stylus is slowly lowered to the record disc to make a soft contact with the surface thereof. This prevents damages of the record disc and the pick-up stylus which are likely to occur when the pick-up stylus is abruptly placed on the record disc.

In the embodiment described above, the damper 31 is provided in a position in which it is capable of cooperating with the end portion 27*b* of the lever 27. However, the position of the damper 31 is not limited to this, but the damper 31 may be provided at any suitable place.

When the cueing lever 42 is pivoted in a clockwise direction to lift the pick-up stylus in the foregoing embodiment, the lever 16 rotates so as to move the support 20 upwardly and the abutting portion 19 downwardly. Accordingly, the abutting portion 19 is spaced away from the inverted V-shaped cam surface of the cam disc 15, whereby the cam disc 15 is released from engagement with the abutting portion 19. It is, therefore, conceivable that the control gear 10 becomes unstable and is caused to rotate slightly by an unnecessary external force such as vibrations with a result that it will subsequently come into meshing engagement with the gear 11 and is rotated thereby. Thus, there may be an accident that an auto-return operation is performed even during playing of the record disc. Furthermore, since the spring 21 must effect returning of both levers 16 and 27, a difficult problem is raised with respect to selection and adjustment of the spring 21.

Figure 6:
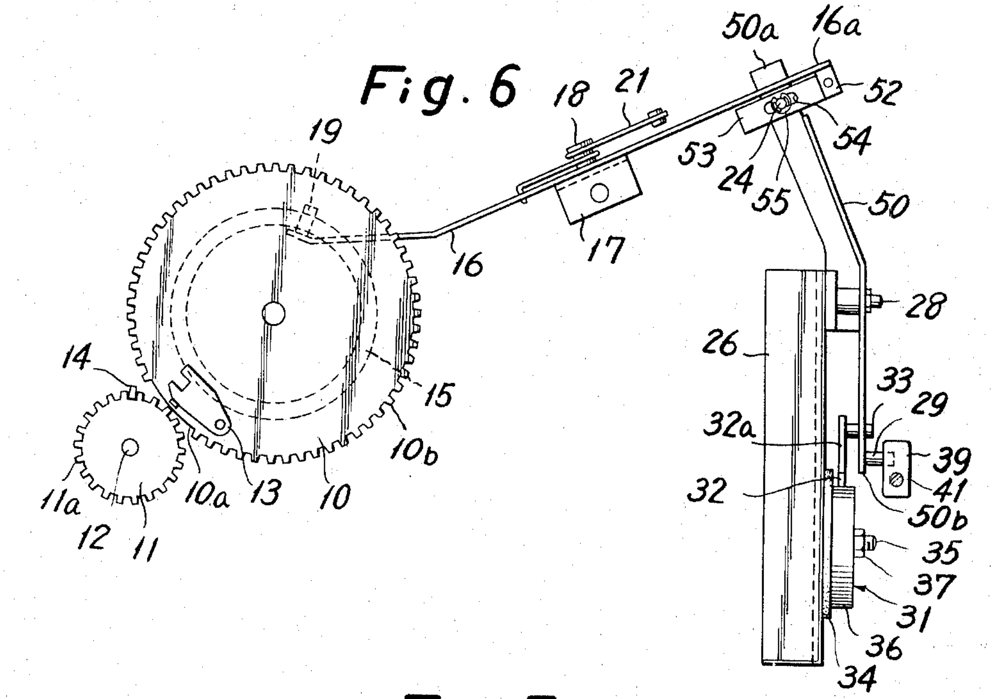
FIG. 6 is a plan view of another embodiment of the manually operable apparatus according to the invention.
Figure 7:
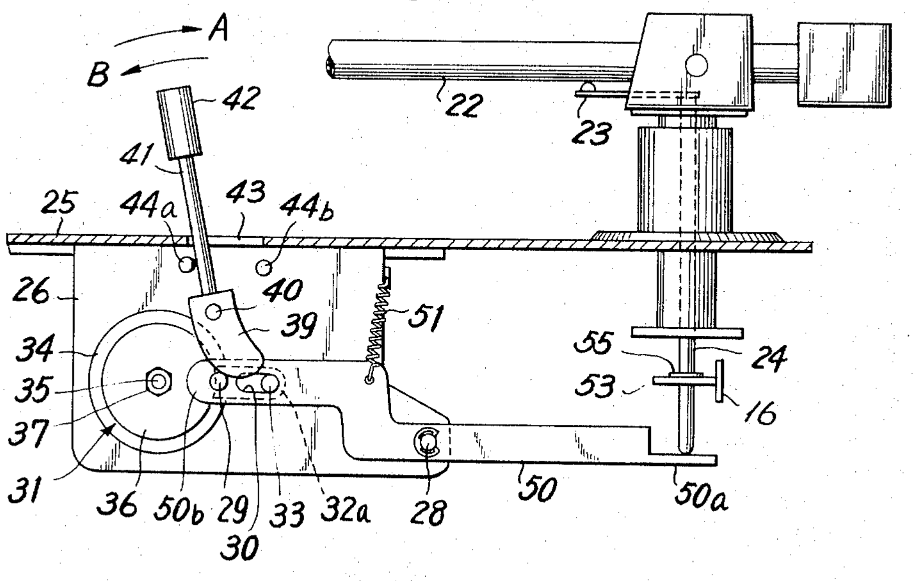
FIG. 7 is a side elevation view of the essential part of the apparatus shown in FIG. 6.

Nextly, another embodiment of the apparatus according to the invention in which the above-described problems are overcome will be described with reference to FIGS. 6 and 7. In FIGS. 1, 2, 6 and 7, the same reference numerals designate the same component parts and the description thereof will be omitted.

One end portion 50*a* of a swinging lever 50 which is pivotally supported on the shaft 28 directly supports the rod 24 of the elevator 23. The other end portion 50*b* of the lever 50 has the stud 29 erected thereon as in the lever 27 of the first embodiment, and is formed with the slot 30 in which the stud 33 is engaged. The lever 50 receives a rotational force in a clockwise direction from a spring 51 stretched between the lever 50 and the bracket 26.

A holding member 52 is fixed to one end portion 16a of the lever 16. The holding member 52 holds one end of a leaf spring 53. The rod 24 extends through a slot 54 formed in the leaf spring 53. An E washer 55 is fixed at a suitable position on the rod 24.

When a known trip mechanism (not shown) is actuated upon finishing of playing of the record disc, the control gear 10 is rotated. As the control gear 10 is rotated, the abutting portion 19 is brought out of engagement with the inverted V-shaped cam surface of the cam disc 15. The abutting portion 19 moves downwardly thereby rotating the lever 16. The end portion 16_a_ of the lever 16 moves upwardly, causing the leaf spring 53 to move upwardly. The rod 24 is moved upwardly by the leaf spring 53 which is in engagement with the E washer 55. As a result, the elevator 23 and the pick-up arm 22 are elevated, whereby the pick-up stylus is lifted from the surface of the record disc. The leaf spring 53 performs an operation of a safety device when the lever 16 is rotated notwithstanding the pick-up arm 22 is restricted to be elevated in such case that the apparatus is transported.

An operation for manually lifting the pick-up arm during playing of the record disc will be explained. During playing of the record disc, the control gear 10 is at a position shown in FIG. 6 with its abutting portion 19 in engagement with the inverted V-shaped cam surface of the cam disc 15. Accordingly, the abutting portion 19 is at its elevated position whereas the leaf spring 53 is at its lowered position. At this state, the cueing handle 42 is moved in a pivotal motion in the direction of arrow A (clockwise direction). The pin 29 is pushed downwardly by the cueing cam 39, in the same manner as in the first embodiment. This causes the lever 50 to be rotated counterclockwise in FIG. 7 against the tension of the spring 51. The counterclockwise rotation of the lever 50 causes its end portion 50_a_ to move upwardly thereby lifting the rod 24 which is supported at its lower end by the end portion 50_a_. The E washer 55 is spaced away from the leaf spring 53. As the rod 24 is lifted, the pick-up arm 22 is also lifted. Thus the pick-up stylus is lifted from the surface of the record disc.

In case it is desired to lower the pick-up arm by a manual operation, the cueing handle 42 is moved in a pivotal motion in the direction of arrow B (counterclockwise direction). By this operation, the pin 29 is disengaged from the cueing cam 39 and the lever 50 is rotated clockwise by the tension of the spring 51. The clockwise rotation of the lever 50 causes its end portion 50a to move downwardly thereby lowering the pick-up arm 22 with the rod 24. At this state, the rotation of the lever 50 is made slow by the damper 31, whereby the pick-up arm 22 is lowered slowly and the pick-up stylus makes a soft contact with the surface of the record disc. At this time, the leaf spring 53 is at its lowered position, so that the leaf spring 53 does not prevent the downward movement of the rod 24.

This invention is not limited to the embodiments hereinabove described but many modifications and variations may be made without departing from the spirit and scope of the invention.

What I claim is:

1. An apparatus for manually operating a pick-up arm in an automatic record player comprising a pick-up arm, an elevator for elevating and lowering said pick-up arm which is mounted thereon, a rod for elevating and lowering said elevator, a cam disc having a cam surface which has a vertically different height and being rotated upon completion of playing of a record disc, a first swinging lever having an abutting portion which is in abutting contact with said cam surface of the cam disc at one end and a rod elevating and lowering portion at the other end, an urging means for applying a rotating force to said first swinging lever so that said abutting portion is constantly in contact with said cam surface of the cam disc, a manually operated handle, a cam means which is pivotally supported and is rotated by operation of said handle, said handle being fixed at the upper portion of said cam means, a second swinging lever having one end portion which engages said cam means and receives a downwardly urging force by the rotation of said cam means and the other end portion which moves said rod upwardly and downwardly, and a damper means for reducing the speed of the downward movement of said rod and lowering said rod slowly, said rod being moved upwardly and downwardly due to rotation of said second swinging lever caused by operation of said manually operated handle in a state in which said rod elevating and lowering portion of the first swinging lever is at its lowered position.

2. An apparatus for manually operating a pick-up arm in an automatic record player comprising a pick-up arm, an elevator for elevating and lowering said pick-up arm which is mounted thereon, a rod for elevating and lowering said elevator, a cam disc having a cam surface which has a vertically different height rotated upon completion of playing a record disc, a first swinging lever having an abutting portion which is in abutting contact with said cam surface of the cam disc at one end and a rod elevating and lowering portion at the other end, an urging means for applying a rotating force to said first swinging lever so that said abutting portion is constantly in contact with said cam surface of the cam disc, a manually operated handle, a cam means which is rotated by operation of said handle, a second swinging lever having one end portion which engages said cam means and receives a downwardly urging force by the rotation of said cam means and the other end portion which moves said rod upwardly and downwardly, and a damper means for reducing the speed of the downward movement of said rod and lowering said rod slowly, said rod being moved upwardly and downwardly due to rotation of said second swinging lever caused by operation of said manually operated handle in a state in which said rod elevating and lowering portion of the first swinging lever is at its lowered position, said damper means comprising a rotating disc which is in engagement with said second swinging lever and is rotated by rotation of said second swinging lever, a viscous material for giving viscosity resistance to the rotation of said rotating disc to make the rotation slow and a cover for covering said rotating disc and said viscous material.

3. An apparatus for manually operating a pick-up arm in an automatic record player comprising a pick-up arm, an elevator for elevating and lowering said pick-up arm which is mounted thereon, a rod for elevating and lowering said elevator, a cam disc having a cam surface which has a vertically different height and being rotated upon completion of playing of a record disc, a first swinging lever having an abutting portion which is in abutting contact with said cam surface of the cam disc at one end and a rod elevating and lowering portion at the other end, an urging means for applying a rotating force to said first swinging lever so that said abutting portion is constantly in contact with said cam surface of the cam disc, a manually operated handle, a cam means which is rotated by operation of said handle, a second swinging lever having one end portion which engages said cam means and receives a downwardly urging force by the rotation of said cam means and the other end portion which moves said rod upwardly and downwardly, and a damper means for reducing the speed of the downward movement of said rod and lowering said rod slowly, said rod being moved upwardly and downwardly due to rotation of said second swinging lever caused by operation of said manually operated handle in a state in which said rod elevating and lowering portion of the first swinging lever is at its lowered position, said rod having an engaging member fixed thereto, said rod elevating and lowering portion of said first swinging lever having an aperture through which said rod extends and is capable of engaging the lower surface of said engaging member of said rod, and said other end of said second swinging lever being in direct abutting engagement with the lower end of said rod.

4. The apparatus as defined in claim 3 further comprising an urging means for urging said second swinging lever to rotate in a direction in which said other end portion engages the lower end of said rod.

* * * * *